May 20, 1924.
R. L. SMITH
TRAP
Filed Jan. 15, 1923     2 Sheets-Sheet 1
1,495,116
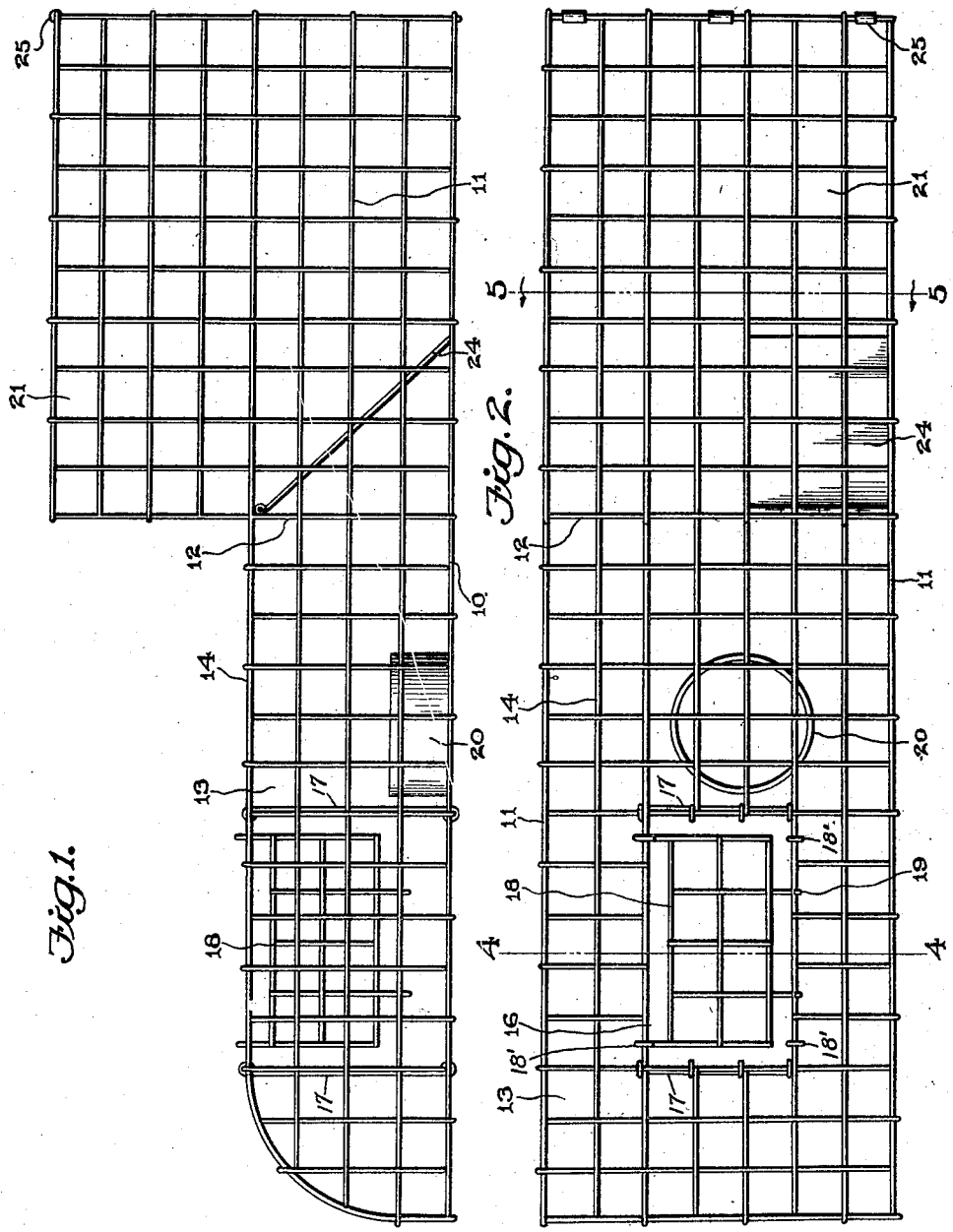
Robert L. Smith
INVENTOR
BY *Victor J. Evans*
ATTORNEY
WITNESS:

May 20, 1924.
R. L. SMITH
TRAP
1,495,116
Filed Jan. 15, 1923   2 Sheets-Sheet 2
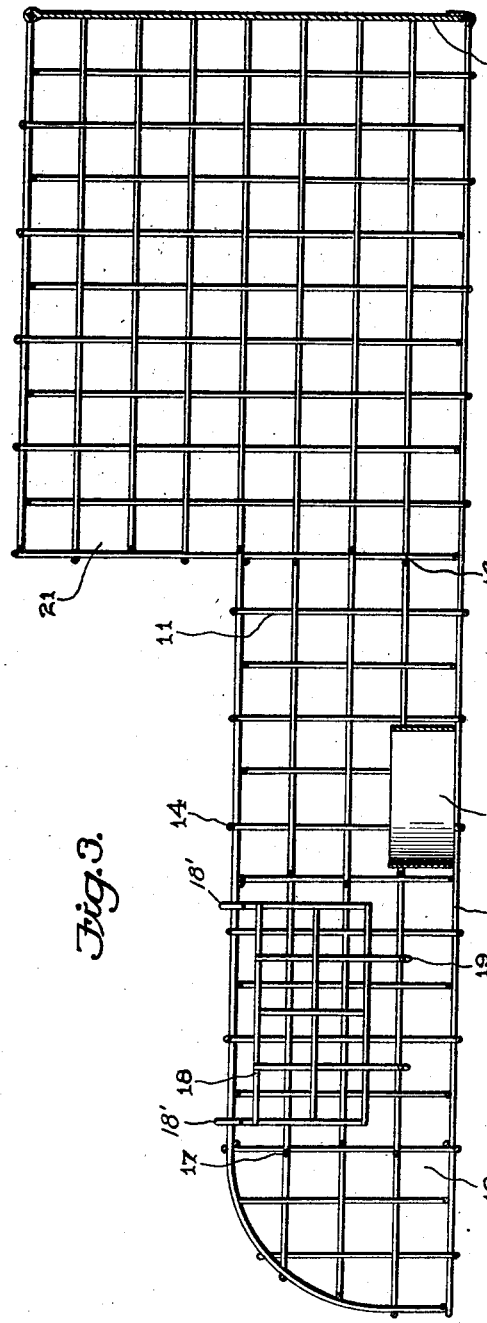
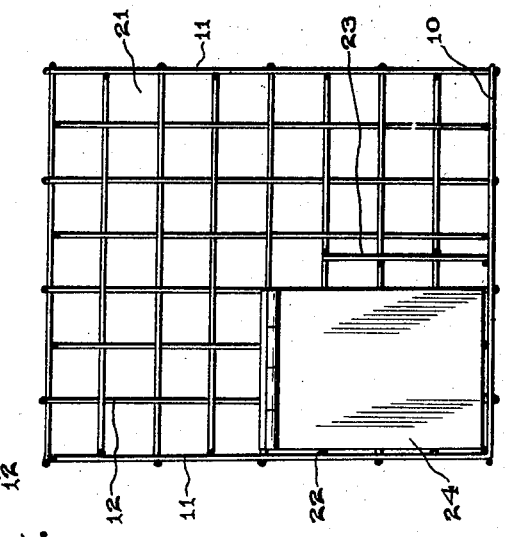
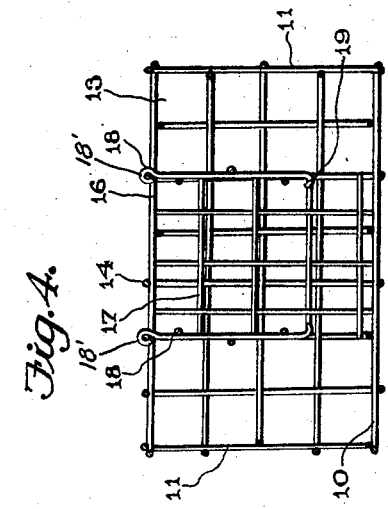
Robert L. Smith
INVENTOR
BY Victor J. Evans
ATTORNEY
WITNESS:

Patented May 20, 1924.

1,495,116

UNITED STATES PATENT OFFICE.

ROBERT L. SMITH, OF LYNCHBURG, VIRGINIA, ASSIGNOR, BY DIRECT AND MESNE ASSIGNMENTS, TO SMITH MANUFACTURING CO., INC., OF LYNCHBURG, VIRGINIA, A CORPORATION OF VIRGINIA.

TRAP.

Application filed January 15, 1923. Serial No. 612,716.

*To all whom it may concern:*

Be it known that I, ROBERT L. SMITH, a citizen of the United States, residing at Lynchburg, in the county of Campbell and State of Virginia, have invented new and useful Improvements in Traps, of which the following is a specification.

This invention contemplates the provision of a rat trap, designed to provide communicating compartments, one of which contains the bait to induce the animal to enter the compartment and from which the only avenue of escape leads into another compartment, in which the animal is trapped by the provision of a normally closed gravitating door which controls the communication between the respective compartments.

In carrying out the invention, I provide the trap with an entrance opening at the top thereof, while depending from the side edges of this opening are swinging doors constructed to prevent the animal from escaping through this opening after entering the compartment of the trap containing the bait, and thereby forcing the animal to enter the trapping compartment in an effort to escape from the trap.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a side elevation of the trap.

Figure 2 is a top plan view with one of the doors in horizontal position.

Figure 3 is a longitudinal sectional view.

Figure 4 is a transverse sectional view taken on the line 4—4 of Figure 2.

Figure 5 is a transverse sectional view taken on the line 5—5 of Figure 2.

The trap forming the subject matter of the present invention may be constructed from any suitable material, and can also vary in size without departing from the spirit of the invention. The trap comprises a bottom 10 and side walls 11, between which is arranged a partition 12 dividing the trap into separate compartments, one of these compartments is indicated at 13, and is defined by the space between the bottom 10, side walls 11 and a top wall 14. The top wall 14 is curved downwardly at one end to form the end wall for the compartment 13, and this downwardly curved portion is connected with the bottom 10 of the trap. This top wall 14 is provided with an entrance opening 16 of a size to permit the animal to enter the compartment, and depending from opposed sides of this opening 16 are stationary walls 17 the width of each being equal to the width of the entrance opening and which connect the top 14 with the bottom 10. The parallel wires of each wall 17 have their opposed ends tightly coiled about the top and bottom of the trap as clearly shown in Figures 1 and 2. Depending from the remaining two edges of the entrance opening 16 are swinging doors 18, the latter terminating in spaced relation to the bottom 10, that is of course, above the lower edges of the stationary walls 17. The parallel wires of these doors 18 have their upper extremities loosely coiled about the top 14 as at 18', thus allowing the doors to swing as described. The lower edges of the swinging doors are provided with inturned projections 19 for a purpose to be hereinafter described. It will be noted that the stationary walls 17 together with the swinging doors 18 unitedly define what may be termed an auxiliary compartment, in which the animal is initially trapped as he enters the opening 16, inasmuch as the animal cannot escape through this opening by reason of the construction and arrangement of the swinging doors 18. Arranged directly behind one of the stationary walls 17 in the compartment 13 is a bait container 20, the bait being in full view of the animal, and arranged adjacent the opening 16 to induce the animal to enter the trap in an effort to obtain the bait. After the animal has entered the auxiliary compartment above mentioned, and attempted to escape from the trap through the entrance opening, one or the other of the swinging doors 18 with which he comes in contact will be forced to a horizontal position such as shown in Figure 2, thus closing the entrance opening to prohibit an escape. The inwardly curved extremities 19 on either door are arranged to hook beneath the edge of the entrance opening directly opposite from the edge upon which the door is swung as shown in Figure 2, these hooks limiting the movements of the doors to horizontal positions. However, when pressure is removed from the door, the same will gravitate to its normally vertical position.

Another compartment of the trap is indicated at 21, and communication between this compartment and the compartment 13 is established through an opening 22 in the partition 12 adjacent one of the side walls 11. The partition 12 is provided with an extension 23 which projects rearwardly from the partition at one side of the opening. Pivoted on the partition immediately above the opening 22 is a normally closed door 24 which reposes upon the bottom 10. The construction and arrangement of this door is such, that the animal is allowed to pass from the compartment 13 into the compartment 21 beneath the door, which is light so that it can be forced upwardly by the animal for this purpose. However, just as soon as the animal enters the compartment 21 the door gravitates to its normal position making it impossible for the animal to leave the compartment 21. The animal is thus trapped in this compartment, and cannot leave the trap until the door 25 is opened. This door as shown forms a rear wall of the trap. In other words, the animal is not trapped until he reaches the auxiliary compartment and enters either the bait chamber or the chamber surrounding the auxiliary compartment, because in order to move either one of the doors 18 to closed position, the animal must first get into the chamber surrounding the auxiliary chamber, and in order to enter the last mentioned chamber from the auxiliary chamber, it must of necessity move one of the doors 18 upwardly, since the space between the lower end of these doors and the floor is not large enough to allow the animal to pass.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

An animal trap comprising a body, a vertical partition dividing the trap into a front compartment and a rear compartment, said partition having an opening establishing communication between said compartments, a normally closed movable door controlling said communication, the top wall of the front compartment having an entrance opening, stationary walls depending from the opposite end edges of said opening and connected with the bottom of the trap, said walls being of a width equal to the width of said opening, swinging doors suspended from the opposite side edges of said opening and terminating in spaced relation to the bottom of the trap, and adapted to be swung to a horizontal position by the animal in an attempt to escape from said front compartment through the entrance opening, and inwardly curved projections carried by the lower edge of each door and adapted to engage the opposite side edge of the opening to limit the upward swinging movement of said door to effectively close said opening when the door is swung to a true horizontal position.

In testimony whereof I affix my signature.

ROBERT L. SMITH.